United States Patent [19]
Asbury et al.

[11] Patent Number: 5,302,956
[45] Date of Patent: Apr. 12, 1994

[54] MULTI-FREQUENCY, MULTI-TARGET VEHICULAR RADAR SYSTEM USING DIGITAL SIGNAL PROCESSING

[75] Inventors: Jimmie R. Asbury, Imperial Beach; Bryan D. Woll, Laguna Niguel; Van R. Malan, La Jolla, all of Calif.

[73] Assignee: Vorad Safety Systems, Inc., San Diego, Calif.

[21] Appl. No.: 930,066

[22] Filed: Aug. 14, 1992

[51] Int. Cl.⁵ .............................................. G01S 13/00
[52] U.S. Cl. ....................................... 342/70; 342/196
[58] Field of Search ........................ 342/70, 71, 72, 196

[56] References Cited

U.S. PATENT DOCUMENTS

| | | |
|---|---|---|
| Re. 29,401 | 9/1977 | Aker et al. |
| 4,110,754 | 8/1978 | Endo ................................... 342/70 |
| 4,335,383 | 6/1982 | Berry. |
| 4,673,937 | 6/1987 | Davis. |
| 5,181,038 | 1/1993 | Asbury et al. ........................ 342/70 |

Primary Examiner—Mark Hellner
Attorney, Agent, or Firm—Spensley Horn Jubas & Lubitz

[57] ABSTRACT

A vehicular collision avoidance radar system using digital signal processing techniques including a transmit section that generates a two channel transmit frequency. An antenna both transmits the transmit signal and receives a reflected receive signal. A Schottky diode mixer generates a difference signal having a frequency equal to the transmit frequency minus the receive frequency. A signal switch in a front end electronics section time demultiplexes and samples the channel 1 and channel 2 signals. The samples are coupled to a two-channel analog to digital (A/D) converter. A digital electronics section receives the digital information and performs a Fast Fourier Transform (FFT) on each channel of digital data to determine relative speed and range of a target based upon the frequency and the difference in phase of the two channels. The digital electronics section also receives information regarding the status of vehicle operation and/or controls to determine the degree of danger presented by an identified target.

14 Claims, 9 Drawing Sheets

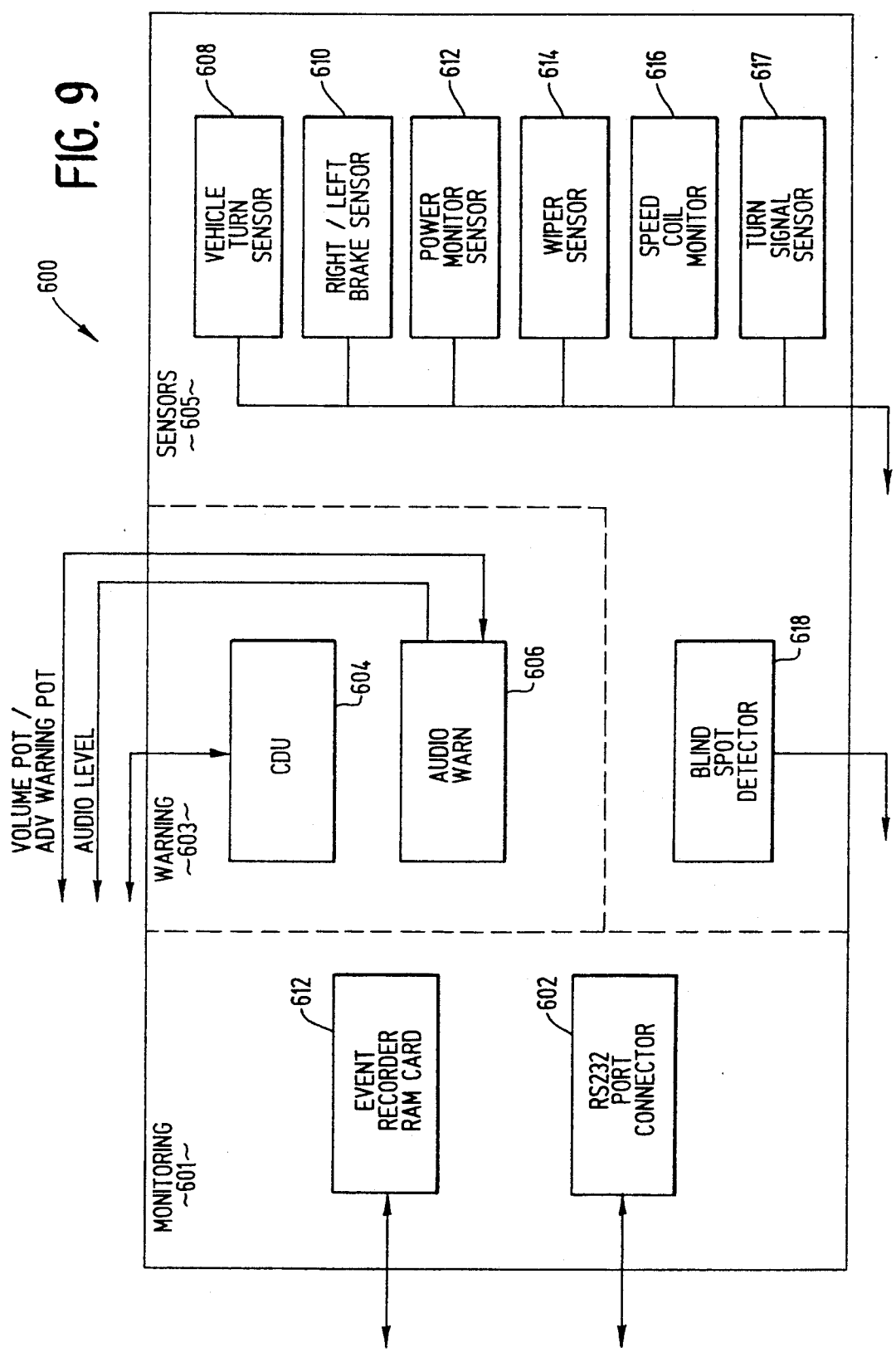

MULTI-FREQUENCY, MULTI-TARGET VEHICULAR RADAR SYSTEM USING DIGITAL SIGNAL PROCESSING

BACKGROUND OF THE INVENTION

1. Field of the Invention

This invention relates to vehicular radar systems, and more particularly to a vehicular collision avoidance radar system using digital signal processing techniques.

2. Description of Related Art

There is a continuing need to increase the density of vehicles traveling the world's roadways, and simultaneously to improve the safety of highway vehicle operations by preventing highway vehicles from colliding with stationary and moving objects (such as roadside obstacles and other vehicles). One means for accomplishing these seemingly contradictory goals is to monitor the relative speed, direction of travel, and distance between vehicles sharing the roadway, and to use such information to provide direct indications to the vehicle's operator of potential danger. It is becoming increasingly more common for automotive engineers to consider the use of microwave radar systems as a means to monitor such environmental conditions.

Vehicle borne radar systems which transmit and receive at three different frequencies on a time division basis, with two of the frequencies being used to determine range, and the third being combined with one of the first two to determine closing speed and likelihood of collision, are presently known. One such system is disclosed in U.S. Pat. No. 3,952,303 to Watanabe et al., which teaches an analog radar signal processing front end.

However, analog systems such as the one disclosed in Watanabe are sensitive to temperature changes, and are difficult to calibrate. Furthermore, such systems are dedicated to particular tasks, such as determining the range and relative rate of motion of other objects, and therefore are difficult to upgrade and customize to meet varying requirements. Still further, the transmit and receive frames in such three frequency systems can be wasteful, in that only small portions thereof are needed to determine the range and relative rate of motion of a target, with the remaining portions of the frame being unused.

Another recent example of an automotive radar system that uses analog signal processing techniques to analyze reflected radar signals is described in U.S. patent application, Ser. No. 08/020,680, entitled Multi-Frequency Automotive Radar System, and assigned to the assignee of the present invention. In that system, a transmit signal and the reflected received signal are coupled to an RF mixer. The relevant output from the RF mixer is a signal that has a frequency equal to the difference between the transmit and receive frequencies. The frequency of the reflected received signal may be shifted from the frequency of the transmit signal upon its return due to the "Doppler" effect. Doppler effect occurs whenever a transmitted signal reflects off a target that has a motion relative to a transceiver. The resulting frequency shift is referred to as a "Doppler shift".

The transmit signal changes at regular intervals between three frequencies spaced 250 kHz apart. Two of the frequencies are used to generate range information as described therein, while a third frequency is used to determine Doppler closing rate and target selection. After substantial analog waveform detection, amplification, shaping, and gating, the information regarding range, closing rate, and target selection can be input to a microcontroller for digital processing.

The use of analog processing techniques is fast and allows real time processing. However, the cost of analog circuitry is typically much greater than the cost of digital circuitry. Thus, the sooner the analog signal can be converted to a digital signal and handled by digital circuitry, the lower the cost of the system. Additionally, digit signal processing circuits are much less sensitive to temperature and manufacturing variations and interference from noise than are analog signal processing circuits. Furthermore, the use of analog signal processing techniques limits the number of features that can be added to a system since each new feature typically requires all new processing hardware. In contrast, many additional features can be added to a system in which digital signal processing is used to determine range and relative motion simply by adding software. Still further, in analog systems the level of sophistication that can be achieved is limited by the available hardware and the cost of such hardware.

Because only a small part of the reflected signal is returned to the antenna, target detection runs from very good to non-existent, even when a strongly reflecting target is present. Improving the ability to detect targets requires sophisticated signal processing. Under many circumstances, such sophisticated signal processing is the only means by which meaningful information can be attained. Without sophisticated information processing it may be difficult to identify and interpret the reflected signal. This level of processing essentially mandates digital signal manipulation.

Therefore, there is a need for an automotive radar system that converts signals received into digital form before processing of those signals. Furthermore, there is a need for a simplified system in which only two frequencies are broadcast and in which a larger portion of the transmit signal is useful.

SUMMARY OF THE INVENTION

The invention comprises a microwave transceiver section, a front-end electronics section, a digital electronics section, and a display and sensor section.

The microwave transceiver section includes an oscillator, such as a Gunn diode, that generates two frequencies corresponding to two time-division-multiplexed channels. The two channels are preferably spaced apart by about 250 kHz and are time multiplexed into a single output. In the preferred embodiment of the present invention, an antenna both transmits the transmit signal and receives a reflected receive signal. A Schottky diode mixer is coupled to the transmitted signal and the received signal. The output of the diode mixer is a difference signal having a frequency equal to the absolute value of frequency of the transmitted signal minus the frequency of the received signal. A signal switch in the front end electronics section time demultiplexes and samples the channel 1 and channel 2 signals.

The filtered samples are coupled to a two-channel analog to digital (A/D) converter. The A/D converter digitizes the sampled signals and time multiplexes the digital data. The resulting digital data stream represents the received signal as a time multiplexed function of the transmitted signal. Since the power level of the transmitted signal is constant, power variations in the signal applied to the A/D converter are attributable to power variations in the received signal. The output of the A/D converter is coupled to the digital electronics section.

The digital electronics section receives the digital information and performs a Fast Fourier Transform (FFT) on each channel of digital data to determine the spectral content thereof. When there is more than a predetermined amount of power at the same Doppler frequency in both channels, a target is assumed to be present. The digital electronics section determines the exact phase relationship between the channel 1 signal and the channel 2 signal FFT output. A microprocessor determines the range of a target based upon the difference in phase between the two signals represented by the digital data.

Motion relative to the transceiver is determined by the Doppler shift in the signal returned from a target. The digital electronics section can identify and track a plurality of targets. Targets are distinguished by their frequency (i.e., amount of Doppler shift). The digital electronics section also receives information regarding the status of vehicle operation and/or controls, such as the speed of the vehicle, the relative position of the steering wheel, pressure upon the brakes, whether a turn signal is active, and whether the windshield wipers are active. This is used to determine the degree of danger presented by an identified target.

Information regarding each target is output by a microcontroller within the digital electronics section. The microcontroller includes an audio warning unit, a control display unit, a plurality of sensors, and an RS-232 interface to allow communications with outside devices. The audio warning unit activates an audio warning when a condition exists that requires attention. The extent of the warning is proportional to the degree of danger. Likewise, the display and sensor section has a variety of visual displays that indicate the status of the environment detected by the radar system.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

FIG. 9 is a block diagram of the display and sensor section of the vehicular radar system of the present invention.

Like reference numbers and designations in the various drawings refer to like elements.

DETAILED DESCRIPTION OF THE INVENTION

Throughout this description, the preferred embodiment and examples shown should be considered as exemplars, rather than as limitations on the present invention.

Overview

Figure 1:
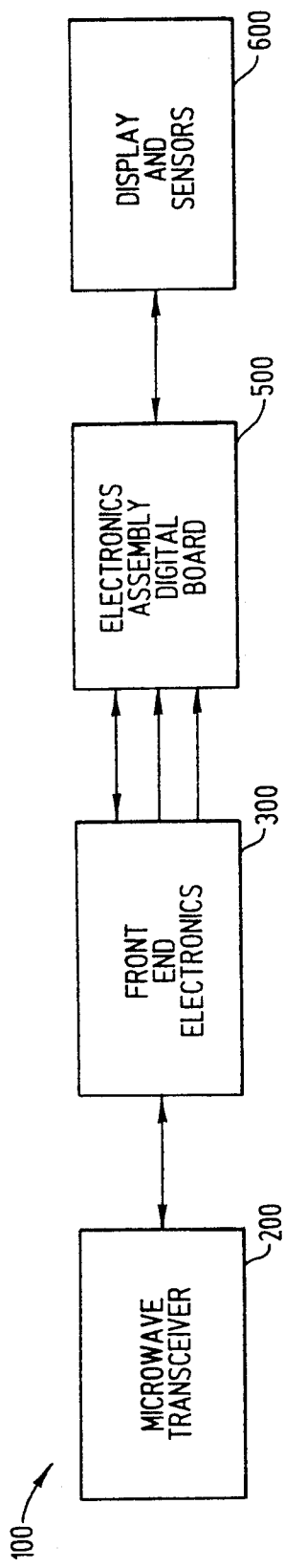
FIG. 1 is a simplified block diagram of the vehicular radar system of the present invention.

FIG. 1 is a high level block diagram of the preferred embodiment of the inventive automotive radar system 100. The system 100 detects objects (targets) in the environment surrounding the vehicle in which the system 100 is mounted, determines the range and relative motion of each target with respect to the system 100, and alerts the automotive operator of potential hazards that could result from the presence or motion of such targets.

A microwave transceiver section 200 transmits and receives Radio Frequency (RF) signals. The received signals are compared to the transmitted signals. A difference signal is generated having a frequency equal to the difference between the frequency of the transmit and the receive signal. The difference signal is coupled to a front end electronics section 300. The front end electronics section 300 digitizes the difference signal. The digitized difference signal is coupled to a digital electronics section 500 which determines the range and relative motion of each target. The digital electronics section 500 is coupled to a display and sensor section 600. The display and sensor section 600 has a plurality of sensors that indicate to the system the status of various vehicle controls. The display and sensor section 600 also produces audio and visual indications for presentation to the automotive operator.

Microwave Transceiver Section

Figure 2:
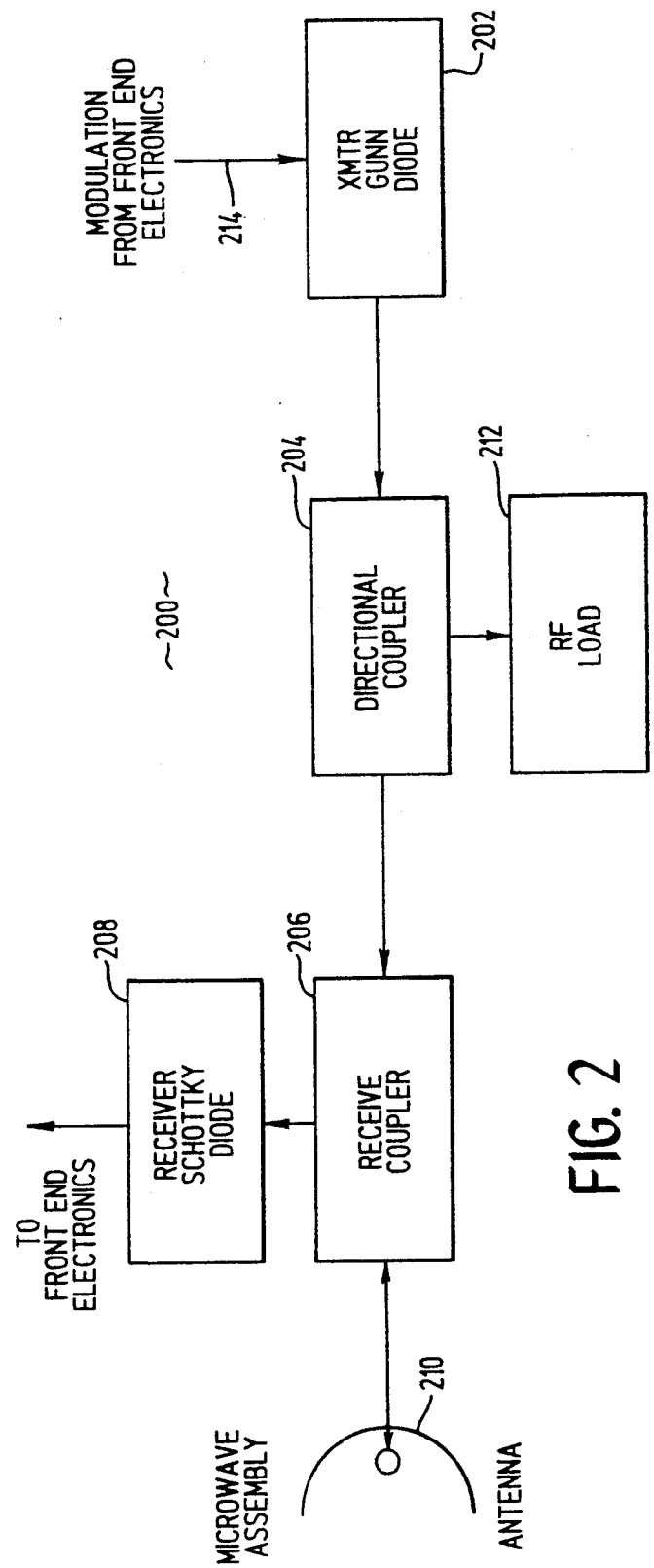
FIG. 2 is a block diagram of the microwave transceiver section of the vehicular radar system of the present invention.

FIG. 2 shows the microwave transceiver 200 in greater detail. The transceiver 200 is relatively conventional, and includes an oscillator 202, such as a Gunn diode used in the preferred embodiment of the present invention, a transmit directional coupler 204, a receive directional coupler 206, a Schottky diode mixer 208, an antenna 210, and an RF load 212. The Gunn diode 202 produces a transmit signal. The frequency of the transmit signal varies as a function of a frequency control voltage signal 406 coupled to the Gunn diode 202 from the front end electronics section 300 on a frequency control voltage signal line 214 (see the timing diagram of FIG. 4). The voltage level that is presented to the Gunn diode 202 on the frequency control voltage signal line 214 alternates between two voltage levels, thereby causing the transmit frequency to alternate between two frequencies. In the preferred embodiment of the present invention, these two frequencies are approximately 24.125 GHz and 24.125250 GHz. The lower of these frequencies is hereafter referred to as the channel 1 frequency, and the higher frequency as the channel 2 frequency. The channel 1 and channel 2 frequencies are spaced approximately 250 kHz apart in the illustrated embodiment.

The transmit signal is coupled through the transmit directional coupler 204 to the antenna 210 via the receive directional coupler 206. The transmit coupler 204 reduces the power of the transmit signal and isolates the Gunn diode 202 from received signals. The output power may be reduced to comply with current Federal Communication Commission regulations. An RF load 212 may be used to absorb excess power that is coupled away from the antenna 210. The receive directional coupler 206 couples signals received by the antenna 210 to the mixer 208 and further isolates the Gunn diode 202 from the received signals. In addition, the receive coupler 206 couples a portion of the transmit signal to the mixer 208. The mixer 208 produces an output that has frequencies equal to the difference between the frequency of the transmit signal and the frequencies of the received signals, i.e., the RF mixer 208 "down converts" the received signals. (It should be understood that the receive signal may at times have a lower frequency than the transmit signal. Throughout this document the phrase "down convert the received signals" is applied to this case as well as to the case in which the received signals have a greater frequency than the transmit signal). Other frequencies are also produced by the mixer 208. However, these other frequencies are not of interest and are filtered out at various points within the system, as discussed below.

When a target is present, the target reflects some of the transmitted signal back into the transceiver antenna 210. Targets that move at different speeds generate different reflected frequencies. For example, the frequency of an RF signal increases when reflected off an approaching target, and decreases when reflected off a retreating target. The frequency change is due to the well-known Doppler shift phenomenon. Therefore, the output of the mixer 208 is, in many cases, the difference between the frequencies of the transmitted signal, and a summation of reflections of the transmitted signal, each Doppler shifted by a different amount and a variety of other signals received signals generated by sources other than the present invention and having various frequencies.

Front End Electronics Section

Figure 3:
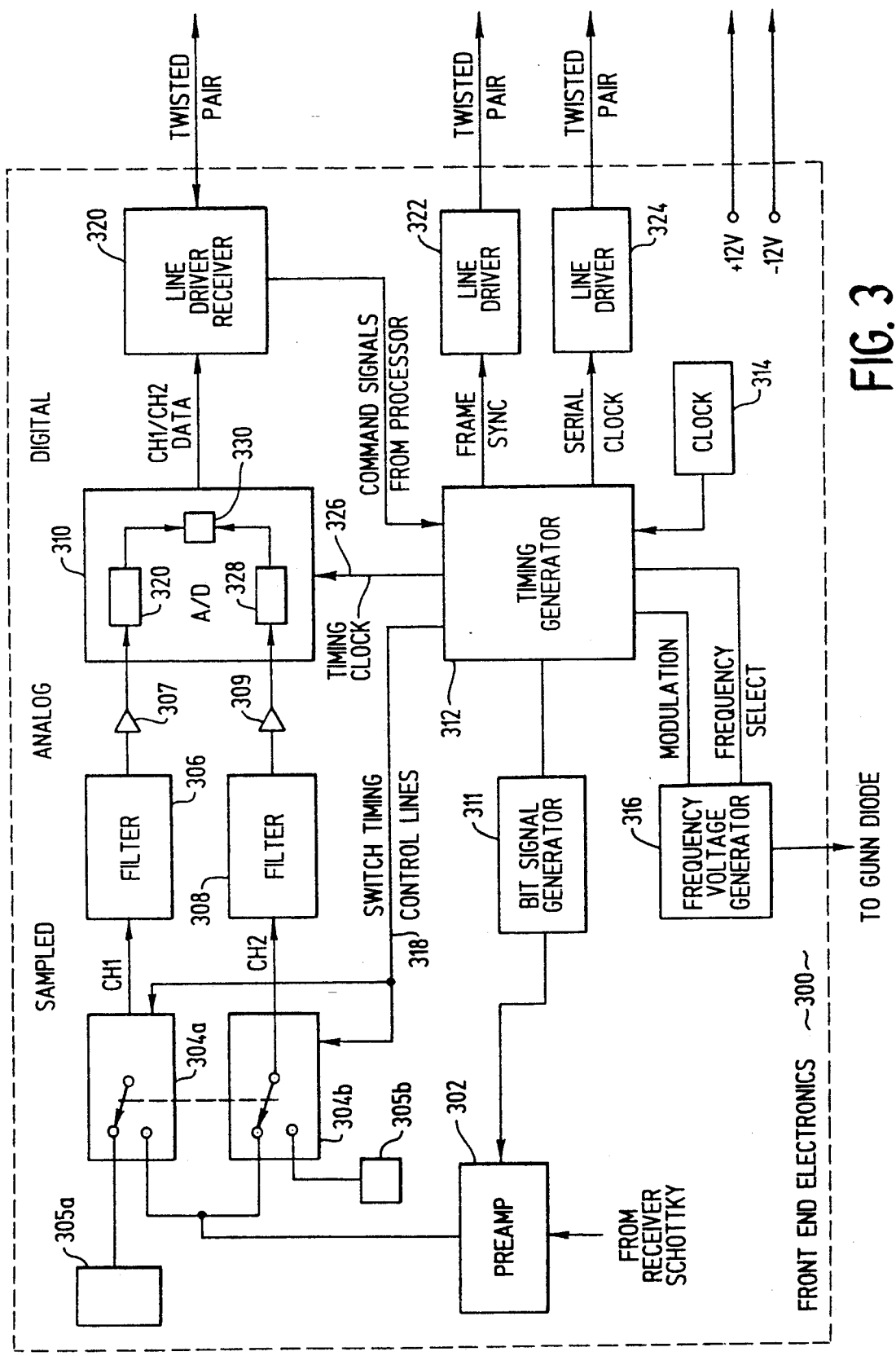
FIG. 3 is a block diagram of the front end electronics section of the vehicular radar system of the present invention.

The output of the mixer 208 is coupled to the front end electronics section 300. The front end electronics section 300 is shown in greater detail in FIG. 3. The front end electronics section 300 includes a preamplifier (preamp) 302, a channel 1 signal switch 304a, a channel 2 signal switch 304b, a channel 1 low pass filter 306, a channel 1 audio amplifier 307, a channel 2 low pass filter 308, a channel 2 audio amplifier 309, an analog to digital converter (A/D) 310, a BIT (Built-In-Test) signal generator 311, timing generator circuit 312, a clock circuit 314, a frequency control voltage generator 316, and various line drivers and receivers 320, 322, 324.

The output of the mixer 208 is coupled to the input of the preamp 302 within the front end electronics section 300. The preamp 302 amplifies the signal coupled from the mixer 208. The signal that is presented to the preamp 302 is a composite of the various signals that are received and mixed with the transmit frequency. Typically, when the transmit frequency is transmitted, a plurality of targets reflect some of the signal back to the antenna 210. Some of those targets may be stationary with respect to the antenna 210, while others may have a relative motion with respect to the antenna 210. By virtue of the Doppler shift that occurs when a radio wave is reflected off a target in motion relative to the transmitter or receiver, the frequency difference between the transmit frequency and the receive frequency can be used to determine the relative speed of the target and to distinguish one target from another, assuming there is a difference in the relative speed of the targets.

A target with a relative speed of 100 miles per hour with respect to the transmitter causes the frequency of the transmit signal to shift by approximately 7.2 kHz. The frequencies that are of interest in the preferred embodiment of the present invention are those frequencies that are within the frequency range of about 0 to 7.2 kHz. Since the received signal is a composite of a signals reflected off a number of targets, the receive signal typically will not be a sinusoid. Of course, higher frequencies could be used.

The strength of the transmitted signal is such that most targets of interest are detected at ranges up to about 1600 feet. The speed at which radio frequency waves propagate through free space is approximately 1 ft/ns. Therefore, at a distance of 1600 feet, there is a round-trip signal delay of about 3.12 $\mu S$. Hence, when a received signal is reflected off a target at a distance, the output of the mixer 208 has a frequency of 250 kHz, plus or minus the Doppler frequency, for the amount of time that it takes the transmit signal to reach the target and reflect back to the transceiver (i.e., 3.12 $\mu S$ for a range of 1600 feet) immediately after the transmit frequency changes from the channel 1 frequency to the channel 2 frequency, and vice versa.

The output of the preamp 302 is coupled to both the signal switches 304a, 304b. The signal switches 304a and 304b time demultiplex the signal from the preamp 302 by coupling the preamp 302 to either the channel 1 audio amplifier 307 and low pass filter 306, or the channel 2 audio amplifier 309 and low pass filter 308, alternatively. Additionally, each signal switch couples the input of the associated filter 306, 308 to a circuit 305a, 305b having an output impedance equal to the output impedance of the preamp 302 (and the input impedance of each filter 306, 308). Thus, a constant source impedance is seen by the filters 306, 308. By ensuring that the source impedance to each filter remains constant, the filters remain linear and so the power of the intermodulation products of the Doppler frequencies of multiple targets created by the nonlinearity of the filters are held to a minimum (and ideally, eliminated). Such intermodulation products, when created, appear as "phantom" targets.

Figure 4:
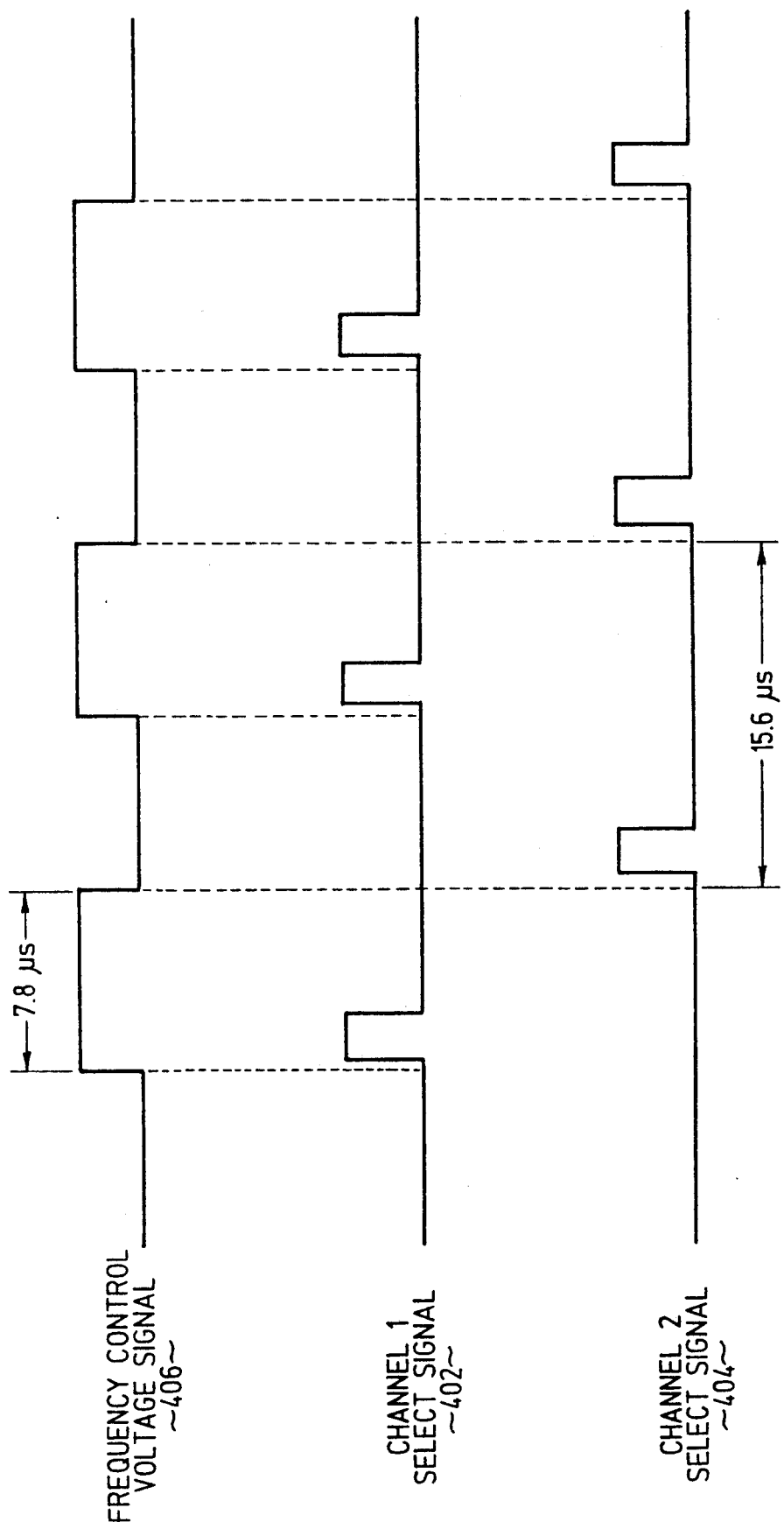
FIG. 4 is a timing diagram of the frequency control voltage signal referenced to the channel 1 and channel 2 select signals.

Paired switch timing control signals 402, 404, coupled to respective paired signal switches 304a, 304b from timing generator circuit 312 on switch timing control lines 318, determine to which filter 306, 308 the preamp 302 output is to be coupled, and the timing of such coupling. FIG. 4 is a timing diagram showing the timing of the switch timing control signals 402, 404 with respect to the frequency control voltage signal 406 coupled to the Gunn diode 202 on the frequency control voltage signal line 214. In the preferred embodiment of the present invention, the frequency control voltage signal 406 alternates between a relatively high voltage and a relatively low voltage at intervals of 7.8 $\mu S$. One period of the frequency control voltage signal 406 is equal to 15.6 μS. Therefore, the output frequency of the Gunn diode 202 alternates between a relatively low frequency (the channel 1 frequency) and a relatively high frequency (the channel 2 frequency) at intervals of 7.8 μS as a function of the frequency control voltage.

The switch timing control signal on switch timing control line 318 includes a channel 1 select signal 402 and a channel 2 select signal 404. The channel 1 select signal 402 in the high state causes the preamp 302 output to be coupled to the channel 1 low pass filter 306 through the signal switch 304. The channel 2 select signal 404 in the high state causes the preamp 302 output to be coupled to the channel 2 low pass filter 308 through the signal switch 304. The signal switch 304 is synchronized to the frequency control voltage signal 406 by the timing generator circuit 312. Therefore, in the preferred embodiment of the present invention, the signal switch 304 connects the preamp 302 to the channel 1 low pass filter 306 for approximately one-fifth of a period (3.12 μS), synchronized to the time when the transmit signal is at the channel 1 frequency. The signal switch 304 also connects the preamp 302 to the channel 2 low pass filter 308 for approximately one-fifth of a period (3.12 μS), synchronized to the time when the transmit signal is at the channel 2 frequency. Hence, the signal switch 304 time demultiplexes the down converted channel 1 and channel 2 signals. Alternative embodiments, in which the length of the channel 1 and channel 2 select signal 402, 404 pulses are longer or shorter, are within the scope of the present invention.

The timing diagram of FIG. 4 shows the channel 1 select signal 402 pulses and the channel 2 select signal 404 pulses offset from the respective edges of the frequency control signal 406 to allow the transmit signal time to stabilize and/or to ensure that the receive and the transmit signals are at the same carrier frequency (i.e., both the receive and transmit signals are at either the channel 1 or channel 2 frequency) at the time the channel 1 and channel 2 select signals 402, 404 are active. However, it should be understood that in alternative embodiments of the present invention, these signals 402, 404 may occur anywhere at or between the rising edge and the falling edge of the frequency control voltage signal 406.

Figure 5:
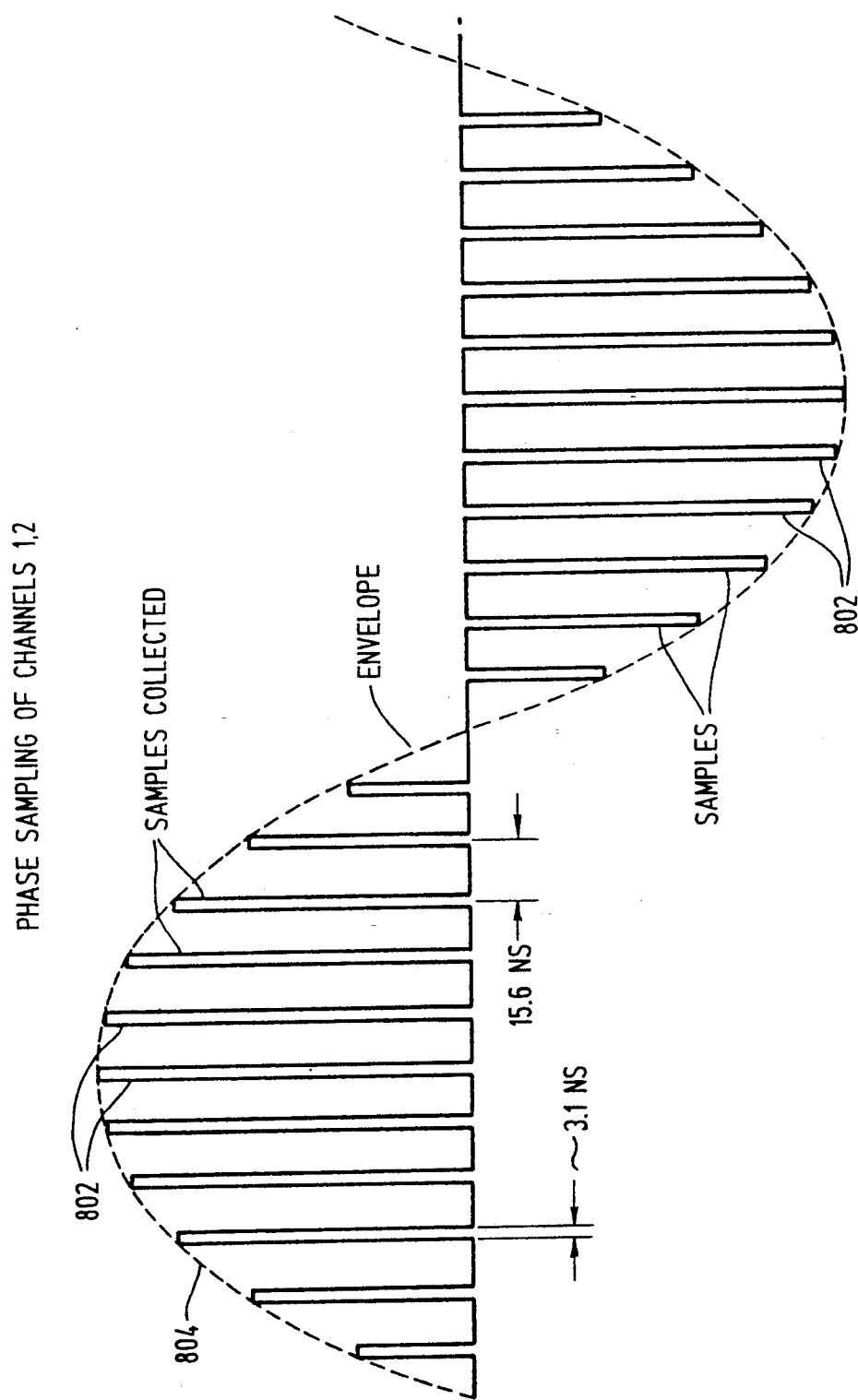
FIG. 5 is an illustration of the envelope of the output of one channel of the signal switch of the vehicular radar system of the present invention.

In the preferred embodiment of the present invention, each filter 306, 308 has a 3 dB cutoff frequency of 24 kHz. The filters 306, 308 reconstruct the output of the signal switch 304 by acting as an envelope detector. The channel 1 low pass filter 306 reconstructs (or "smooths") the time demultiplexed down converted channel 1 signal and the channel 2 low pass filter 308 reconstructs the time demultiplexed down converted channel 2 signal, as shown in FIG. 5. The composite of the samples 802 taken by the signal switch 304 under the control of the channel 1 select signal 402 and the channel 2 select signal 404 creates an envelope 804 that is essentially below the 3 dB cutoff frequency of the low pass filters 306, 308. Therefore, the output of each filter is a smooth signal with frequency components equal to the difference between the frequency of the transmit signal corresponding to the channel associated with the filter and the frequency of each signal received during the time that channel is transmitted. For example, the channel 1 low pass filter 306 outputs a smooth signal with a frequency equal to the difference between the channel 1 transmit frequency and the channel 1 receive frequencies reflected from a multitude of targets as if the channel 1 transmit frequency were transmitted in a continuous wave fashion.

The outputs of each filter 306, 308 are coupled to the A/D converter 310. The A/D converter 310 includes two discrete channels corresponding to front-end signal channels 1 and 2. Each channel of the A/D converter 310 converts the analog inputs from the corresponding down-converted frequency channel into a stream of digital data words. A digital low pass filter 328 within the A/D converter 310 filters each channel, and a multiplexer 330 within the A/D converter 310 time multiplexes the digital data words from each of the A/D converter channels (i.e., channel 1 and channel 2 digital data words are interleaved). The low pass filters 328 within the A/D converter 310 have a 3 dB cutoff frequency of 7.5 kHz. These filters 328, in conjunction with low pass filters 306, 308, ensure that the Nyquist criteria is satisfied with respect to the sample frequency, thereby preventing aliasing when the FFT operation is performed (i.e., the effective sampling frequency from the A/D converter 310 should not exceed one-half the frequency of the doppler frequency of interest).

The A/D converter 310 of the preferred embodiment of the present invention is an oversampling analog to digital converter. The output from the A/D converter 310 is a series of 32 bits data words. The first 16 bits represent the amplitude of the analog signal over a particular period of time (i.e., 16 bit resolution). Bits 17 through 19 indicate whether the A/D converter 310 is near saturation. Bits 20 through the 31 indicate whether the word is associated with channel 1 or channel 2. Knowledge of the proximity of the A/D converter 310 to saturation aids in compensating for any signal distortion that might occur as the A/D converter 310 approaches saturation. Such compensation may be performed in a number of ways that are well known in the art of digital signal processing, such as using automatic gain control corresponding to each value represented by the last three bits of the A/D converter 310 output. In alternative embodiments of the present invention, the output of the A/D converter 310 is merely the digital representation of the input plus one bit that represents the channel of the A/D converter 310. The A/D converter 310 output in such alternative embodiments may have fewer or more than 16 bits of resolution.

The Timing generator circuit 312 determines the sample rate of the A/D converter 310. In the preferred embodiment of the present invention, the A/D converter 310 has a sample frequency of about 1 MHz, as determined by a timing clock signal coupled from the timing generator circuit 312 to the A/D converter 310 on a timing clock line 326. The A/D converter 310 of the preferred embodiment of the present invention oversamples by 64x, and thus has an equivalent sample rate equal to (1/64) MHz=16 kHz. In an alternative embodiment of the present invention, the sample rate can be changed dynamically.

Figure 6:
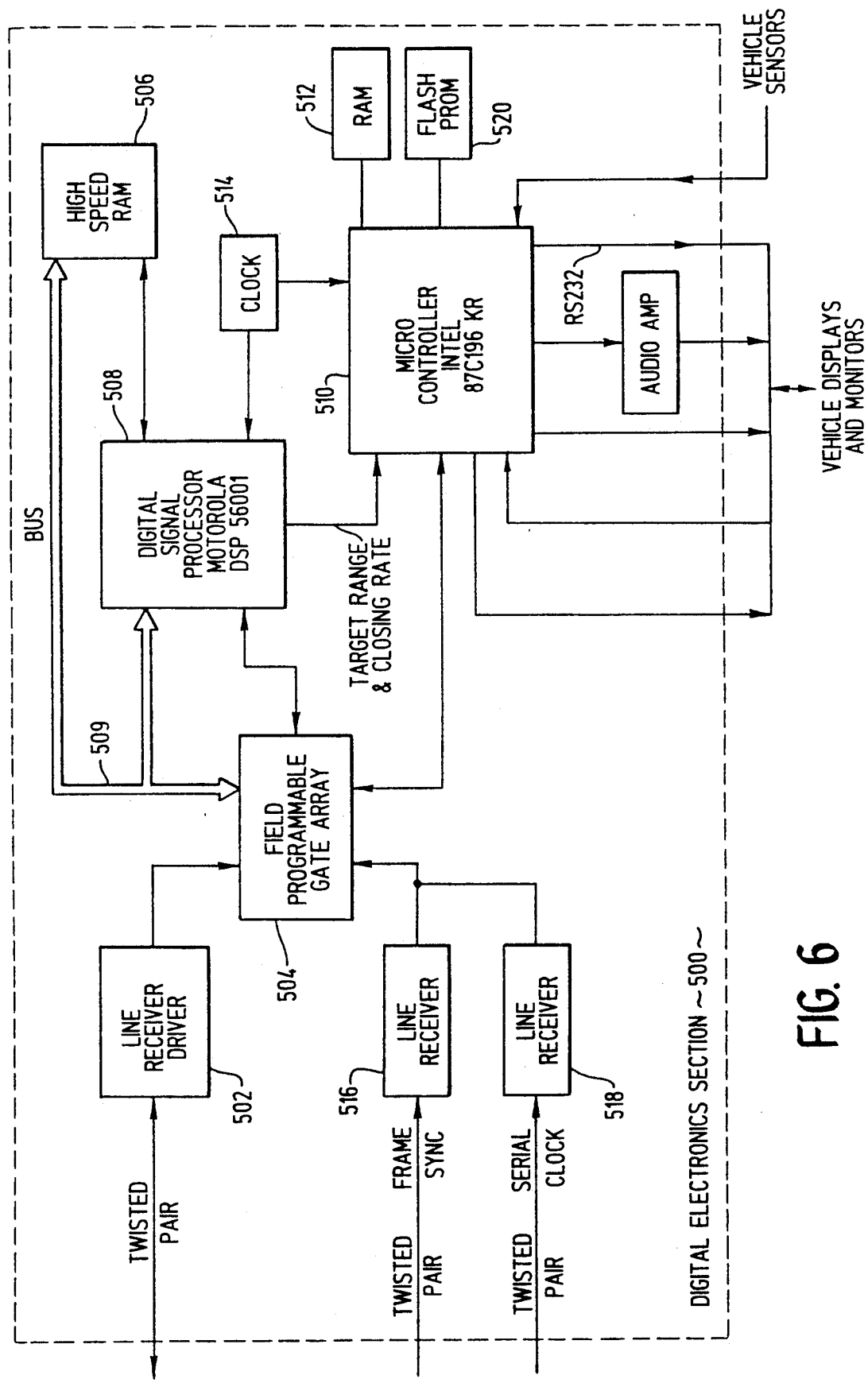
FIG. 6 is a block diagram of the digital electronic section of the vehicular radar system of the preferred embodiment of the present invention.

The preferred embodiment of the present invention has a real-time Built-In-Test (BIT) capability which verifies the proper operation of the system. The BIT signal generator circuit 311 creates a BIT signal upon receiving a command from the timing generator circuit 312. The BIT signal is coupled to the preamp 302 and simulates a signal from the mixer 208. When the BIT signal is injected into the preamp 302, it is summed with the output of the mixer 208. Therefore, the ongoing operations need not be interrupted. In the preferred embodiment of the present invention, the microcontroller 510 (shown in FIG. 6) determines which frequency is to be injected into the preamp 302. The determination is made based upon the absence of other targets. Therefore, normal operation of the system is not impeded by the BIT function. The BIT signal injected into the preamp 302 propagates through the system along with the output of the mixer 208. The microcontroller compares the range and relative motion expected by the microcontroller 510 for the BIT signal with the values of range and relative motion that actually result after the BIT signal propagates through the front-end electronics. Thus, a high degree of certainty that each component in the front end electronics section 300 and the digital electronics section 500 are operating properly can be had.

The timing generator circuit 312 of the preferred embodiment of the present invention also generates a calibrate signal which is coupled to the A/D converter 310. The calibrate signal initiates a calibrate function within the A/D converter 310 which calibrates the A/D converter 310 for selected offsets. Offset calibration of the A/D converter 310 is performed periodically to ensure the accuracy of the conversion. Calibration functions, such as the calibration function of the preferred embodiment of the present invention, are standard features of many A/D converters, such as the CS5336 A/D converter manufactured by Crystal Semiconductor and used in the preferred embodiment of the present invention.

Digital electronics section

The digital output of the A/D converter 310 is coupled to a signal line driver/receiver 320. The line driver/receiver 320 couples the digital signal to the digital electronics section 500. The digital electronics section 500 is shown in greater detail in FIG. 6. A signal line driver/receiver 502 receives the digital output of the A/D converter 310. The signal line driver/receiver 502 is coupled to a field programmable gate array (FPGA) 504, such as a 3042PC84-70 FPGA manufactured by Xilinx. The FPGA 504 accepts the digital data sent from the A/D converter 310 and stores the data in a high-speed random-access-memory 506 (RAM).

The digital data sent from the A/D converter 310 is sent as a synchronous serial data stream to the FPGA 504. A frame synchronization (frame sync) signal and a serial clock (bit sync) signal are generated by the timing generator circuit 312 and transmitted to the FPGA 504 from the front end electronics section 300. The frame sync and serial clock signals are coupled from the timing generator circuit 312 to line drivers 322, 324. The line drivers 322, 324 of the front end section 300 are coupled to line receivers 516, 518, respectively, in the digital electronics section 500. From the line receivers 516, 518, the frame sync and serial clock signals are coupled to the FPGA 504. The frame sync signal identifies the beginning of each digital data word transmitted from the A/D converter 310 to the FPGA 504, and the serial clock signal synchronizes each bit of each digital data word from the A/D converter 310 to the input circuit of the FPGA 504. The generation and use of frame synchronization and serial clock signals to communicate synchronous digital data is well known in the art.

Figure 6A:
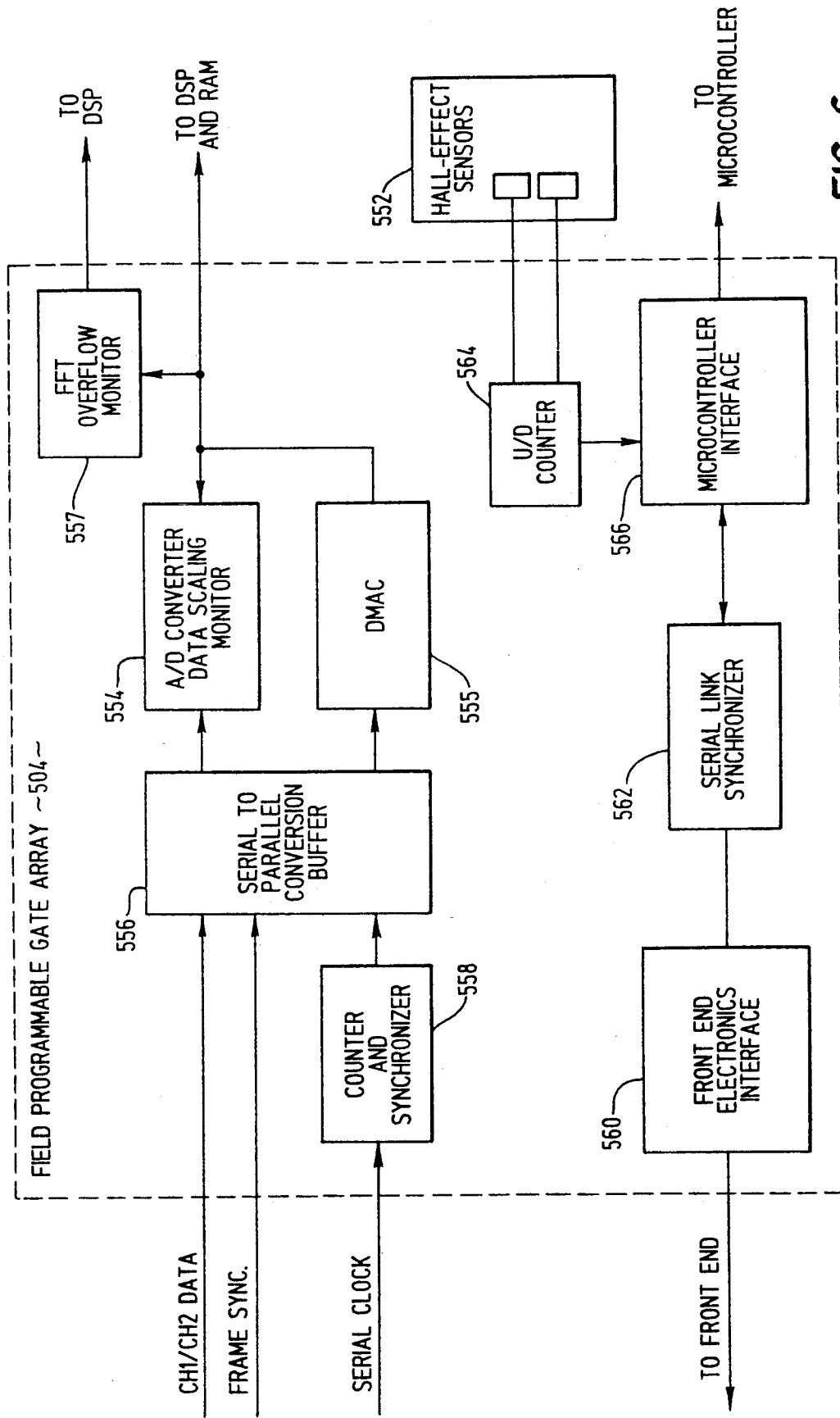
FIG. 6a is a block diagram of the field programmable array of the vehicular radar system of the preferred embodiment of the present invention.

FIG. 6a is a detailed block diagram of the FPGA 504. In the preferred embodiment of the present invention, a direct memory access controller 555 (DMAC), a counter and synchronizer 558, a serial link synchronizer 562, a front end electronics interface 560, a microcontroller interface 566, an up/down counter 564, a serial to parallel conversion buffer 556, an analog to digital data scaling monitor 554, and an FFT overflow monitor 557 are implemented in the FPGA 504. The serial to parallel conversion buffer 556 receives the stream of serial data words from the A/D converter 310 along with the frame synchronization and serial clock signals. The counter and synchronizer circuit 558 counts the number of bits being received by the parallel to serial conversion buffer 556 and couples the serial clock signal to the serial to parallel conversion buffer 556. The serial to parallel conversion buffer 556 converts the serial stream to a parallel format. Each data word sent from the A/D converter 310 includes 32 bits, 16 of which represent the amplitude of the samples taken during a particular sample period. The 16 amplitude bits, together with 8 bits set to a known value, such as zero in the preferred embodiment of the present invention, form a 24 bit parallel word.

The FPGA 504 is coupled to a Digital Signal Processor 508 (DSP), such as model DSP56001 manufactured by Motorola Incorporated. The DSP 508 is coupled to a clock 514 that determines the speed at which the DSP 508 operates. The DSP 508 of the preferred embodiment of the present invention operates at approximately 26 MHz. When a complete 32 bit word has been received from the A/D converter 310, the DMAC 555 initiates a DMA (direct memory access) cycle by asserting a bus-request signal to the DSP 508. When this signal is asserted, the DSP 508 releases a bus 509 shared by the FPGA 504, DSP 508, and the RAM 506. When the DSP 508 is off the bus 509, the DSP 508 asserts a bus-grant signal to the DMAC 555, indicating that the DMAC 555 is granted the use of the bus 509. The DMAC 555 directly writes the 16 bit digitized sample as a 24 bit word to the RAM 506. The lower 8 bits are zero filled. When the DMAC 555 is finished with the write to the RAM 506 the DMAC 555 de-asserts the bus-request signal, thereby allowing the DSP 508 to regain control of the bus 509.

The RAM 506 locations in which the data is written by the DMAC 55 are divided into blocks. Each block of data has two memory areas, each of which are capable of storing 512 words. Each of the memory areas within each block of memory is associated with one of the front-end signal channels. Initially, the DMAC 555 is disabled until the DSP 508 initializes the DMAC 555 by writing the block address of the block of memory in the RAM 506 to which the words are to be stored.

The DMAC 555 reads a channel bit from each serial word and writes the word to the memory area associated with the channel designated by that channel bit. The channel bit alternates with each word read by the DMAC 555, and thus the memory area to which the word is written alternates causing the memory areas associated with each channel to fill concurrently. The DMAC 555 has an internal counter with a maximum count of 511. Each time a word from channel 2 is written to memory, the counter is incremented. To ensure that the counter is synchronized to the write operation, the first increment only occurs after both memory areas have been written to at least once (i.e., if channel 2 is written to before channel 1, the counter does not increment until the second time data is written to channel 2). This causes the first word that was written to channel 2 to be overwritten, however, the benefit of ensuring that each word is current is greater than the benefit of ensuring that no data is dropped.

When the counter reaches a terminal count of 511 (i.e., each of the memory areas are full) the counter returns to zero and the DMAC 555 interrupts the DSP 508. The DSP 508 updates the DMAC 555 with the block address of the next block of memory to which the next series of words is to be written. Thus, the DSP 508 determines the number of samples that have been acquired. The DSP 508 determines the number of samples to be used in an FFT to be performed by the DSP 508 based upon the number of samples acquired.

Each time FPGA 504 asserts the bus-request signal, the A/D converter data scaling monitor 554 monitors the word to be written to the RAM 506. The A/D converter data scaling monitor 554 determines the greatest absolute magnitude for all of the words in the block. Each word is in two's complement format, and so the most significant bit determines whether the value is positive or negative (i.e., is the "sign" bit). The word that has the greatest absolute magnitude also has the least number of "guard" bits. Guard bits are those consecutive bits which are adjacent to, and have the same logic level as, the sign bit. These consecutive bits are referred to as guard bits because they guard the data from overflowing registers within the DSP 508 as digital processing functions, such as FFT operations, are performed. The number of guard bits contained in the word having the fewest guard bits is recorded as a scaling indicator associated with the each memory area of each block to be written. The scaling indicator is stored along with each block of data in the RAM 506.

For example, assume that one memory area of length 5 contained the following words: 00001010; 11110101; 00101011; 00011101; 00010101. The word "00101011" has only two guard bits, whereas each of the other words have at least 3 guard bits. Therefore, the scaling indicator for this memory area would indicate a value of 2 guard bits.

All communications between the microcontroller 510 and the timing generator circuit 312 are routed through the microcontroller interface 566, the serial link synchronizer 562, and the front end electronics interface 560, within the FPGA 504. The front end electronics interface 560 and the microcontroller interface 566 are standard interface circuits, such as are well known in the art. The serial link synchronizer 562 serves as a buffer between the microcontroller 510 and the front end electronics section 300. The serial link synchronizer 562 receives each instruction in serial form from the microcontroller 510, and synchronizes the instruction for transmission to the timing generator circuit 312 via the line driver/receiver 502 and the line driver/receiver 320, in known fashion. Such communications include instructions to the timing generator circuit 312 to initiate an A/D converter calibration procedure, instruction to the timing generator circuit 312 to initiate a BIT, instruction to change carrier frequency if interference is detected, etc. Such instructions are transmitted from the microcontroller 510 to the FPGA 504.

In the preferred embodiment of the present invention, the FPGA 504 also determines a variety of vehicle conditions, such as the position of the vehicle steering wheel. The FPGA 504 receives data from dual Hall-effect sensors 552 which sense the location of a magnet on the steering wheel shaft. In the preferred embodiment of the present invention, an up/down counter 564 implemented in the FPGA 504 counts the revolutions (or partial revolutions, for finer position determination) of the steering wheel to determine the position of the steering wheel. That is, each time the steering wheel is turned one full rotation the counter is incremented. As the steering wheel is returned to a position that would direct the vehicle in a straight line, each full rotation causes the counter to decrement back toward zero. Information regarding the position of the steering wheel is communicated directly to the microcontroller 510 from the FPGA 504.

When sufficient data is present in the RAM 506, the DSP 508 performs an FFT operation that maps the digital representation of the time-demultiplexed receive signal from the time domain into the frequency domain (i.e., performs a spectral analysis of the signal and determines the frequencies and phase that are present and the relative power at each frequency). Performing FFT operations using digital signal processors, such as the DSP56001 used in the preferred embodiment of the present invention, is well known in the art as is demonstrated in Implementation of Fast Fourier Transforms on Motorola's DSP56000/DPS56001 and DSP96002 Digital Signal Processors, Guy R. L. Sohie (published by Motorola Inc., 1991).

Before performing the FFT, the DSP 508 determines the scaling factor to be used (i.e., the number of bits left or right to shift the data) by reading each of the scaling indicators associated with each memory area within each block of data transmitted from the FPGA 504 to the RAM 506. The DSP 508 shifts all the data in each block either to the right or to the left an equal amount, such that the word having the least number of guard bits has exactly two high order guard bits after the shift (scaling) is complete.

For example, if an FFT is to be calculated using 1024 points (i.e., two blocks of data from the RAM 506 including 1024 samples from channel 1 and 1024 samples from channel 2), two scaling indicators are read. Each scaling indicator is associated with two blocks of 512 words, one block associated with each channel. If the scaling factors associated with each memory area of each block indicate values of 1 and 3 respectively, then each word of each block is shifted to the right one bit. This ensures that the word with the least number of guard bits has exactly two guard bits before the FFT calculation is started. Thus, overflow errors are minimized. In contrast, if the values of the scaling indicators associated with the blocks were 3 and 5 respectively, each word of each of the two blocks is shifted to the left one bit to ensure that each word that had three guard bits in the blocks with a scaling factors of 3 now has exactly two guard bits. Thus, truncation errors are minimized.

This process of scaling the values of each block of words is called a "block floating point operation". The purpose of the block floating point operation is to provide the greatest accuracy in the calculation of the FFT, while ensuring that the results of the calculations do not overflow the registers in which they are stored. Because the DSP of the preferred embodiment of the present invention is not a floating point processor, such block floating point operations are necessary. However, block floating point operations are not necessary in processors which perform true floating point calculations. A digital signal processor which has true floating point capabilities could be used in an alternative embodiment of the present invention.

The FFT overflow monitor 557 performs block floating point scaling monitor operations on data that results from intermediate calculations performed by the DSP 508 during the process of calculating the FFT. These block floating point scaling monitor operations ensure that the intermediate products from the FFT operation do not overflow those registers within the DSP 508 which hold them.

Since the DSP 508 is capable of performing an FFT operation on complex numbers, the FFT operation is linear, and the operation is being performed on data having only real values, both channels of data from the A/D converter 310 are transformed in a single operation. Thus, both channels can be transformed in nearly the same amount of time required to transform only one channel. This procedure in particular, as well as FFT operations in general, are explained in greater detail in *Introduction to Digital Signal Processing*, John G. Proakis and Dimitris G. Manolakij, at pg. 720 et al., which is hereby incorporated by reference.

The DSP 508 circuit used in the preferred embodiment has one register ("real register") that is intended to accommodate the real portion of each sample, and a second register ("imaginary register") that is intended to accommodate the imaginary portion of each sample. Because the samples from each channel are real, the imaginary portion is zero. Therefore, normally when performing an FFT operation on such real data, the imaginary register initially would be set to zero. However, instead of loading the samples from channel 1 into the real register and setting the imaginary register to zero, the real samples from channel 2 are loaded into the imaginary register. When the FFT is completed, the results can be separated to produce the transform of each of the two sequences by applying the formula: $X_1(k) = [\frac{1}{2}][X(k) + X^*(N-k)]$, and $X_2(k) = [\frac{1}{2}j][X(k) - X^*(N-k)]$; where $X(k)$ is the FFT of $x(n)$, $X_1(k)$ is the FFT of the sequence of samples from channel 1, $X_2(k)$ is the FFT of the sequence of samples from channel 2, $X^*(k)$ is the complex conjugate of $X(k)$, and N is the number of samples in each sequence.

Performing the FFT transforms the channel 1 and channel 2 digital data from the time domain to the frequency domain. Therefore, the result of the FFT operation is a list of frequencies and the power associated with each such frequency. The result of the FFT is periodic, having a period that is equal to the sampling frequency. In the preferred embodiment of the present invention, the sampling frequency is 15 kHz. Therefore, the range of frequencies into which the time domain signal is mapped is equal to the sample frequency. When the power at a particular frequency is greater than a selected threshold amount, the DSP 508 determines that a target is present.

By counting the number of frequency peaks at which power is detected to be over the threshold, the DSP 508 determines how many targets are present (i.e., how many targets are moving at different speeds). Targets that are moving at the same speed reflect signals that have the same frequency. Such targets are not distinguishable one from another. In the illustrated embodiment, targets must differ in speed by at least $\frac{1}{4}$ MPH (a Doppler shift of 18 Hz) to be individually identified. This limitation is fixed by the resolution with which the DSP 508 can discriminate between frequencies. In an alternative embodiment in which the DSP 508 has greater resolution, the ability to distinguish targets is greater.

The DSP 508 also determines the phase relationship of the channel 1 signal to the channel 2 signal. This can be easily determined by applying the formula, ARCTAN $[\{(B \times C) - (A \times D)\}/\{(A \times C) + (B \times D)\}] = \phi$ (difference in phase), where A=the value of the real portion of the transformed channel 1 signal, B=the value of the imaginary portion of the transformed channel 1 signal, C=the real portion of the transformed channel 2 signal, and D=the value of the imaginary portion of the transformed channel 2 signal. Separate registers within the DSP 508 contain the real and imaginary values for the transformed channel 1 and channel 2 signals, making it a simple matter to implement the above formula to determine the phase relationship between the channel 1 and channel 2 signals at each frequency. Using a greater number of samples provides greater accuracy in determining the phase relationship. Using 4096 samples yields phase information with sufficient resolution to determine the range with an accuracy of 0.25 ft.

Figure 7:
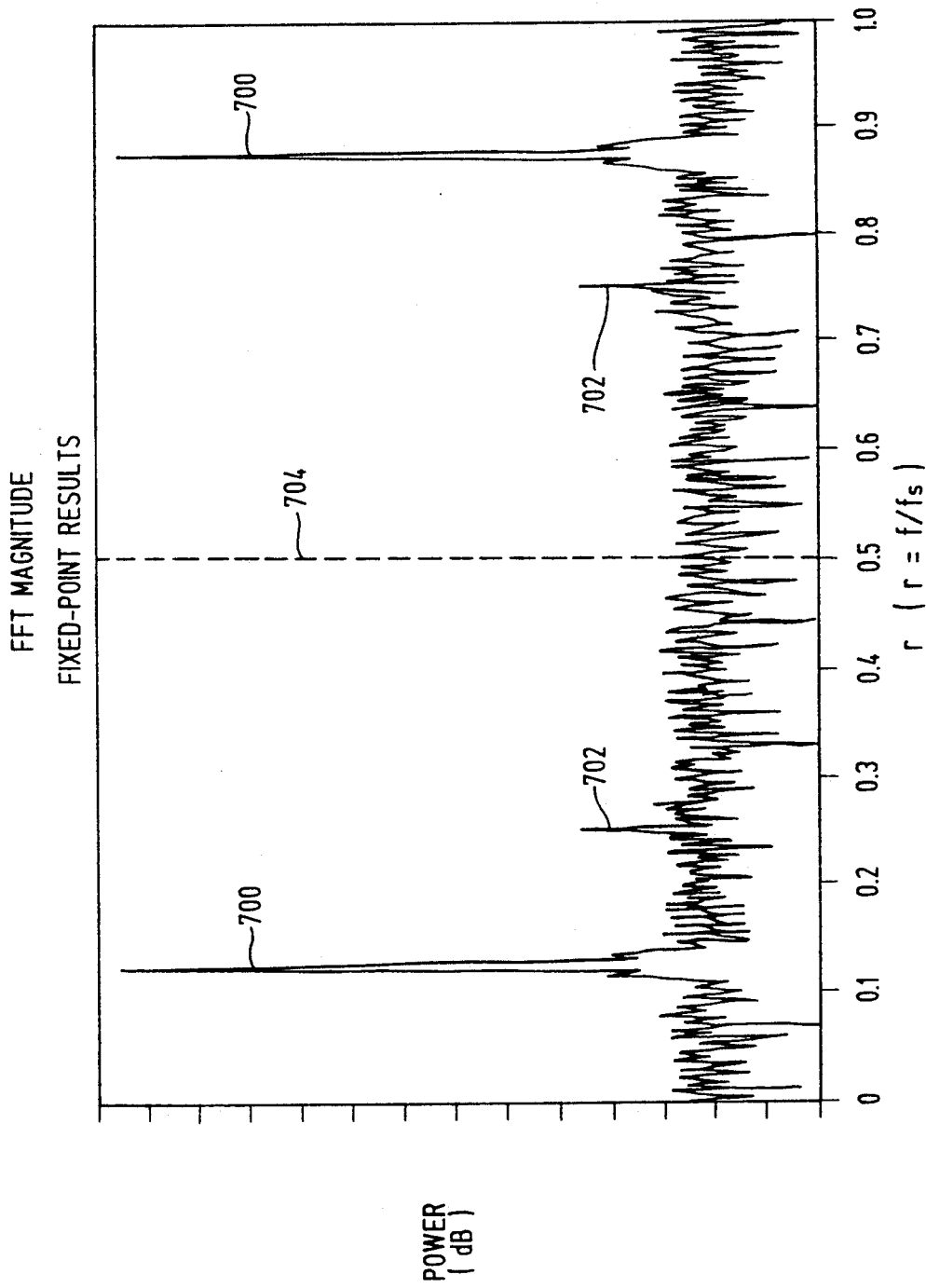
FIG. 7 is a graph of the results of a FFT operation as performed by the DSP of the preferred embodiment of the present invention.

FIG. 7 is a graphic representation of the result of a typical FFT operation, wherein the receive signal was reflected off two targets, one of which is moving at a relative speed of 26 MPH with respect to the vehicle on which the system was mounted, the other moving at a relative speed of 52 MPH with respect to the vehicle on which the system was mounted. The hash marks along the X-axis are spaced in increments of $(0.1 \times f_s)$ Hertz, where $f_s$ is the sample frequency (in the preferred embodiment of the present invention, $f_s = 15$ kHz). Power at each frequency is plotted on the Y-axis in decibels. No particular values are attached to each hash mark along the Y-axis, since the power is plotted as a relative value.

A spike 700 along the X-axis represents the target moving at a relative speed of approximately 26 MPH. The relative speed is calculated by: $V = (f_d \times C)/(2 \times f_{rf})$, where V is the relative speed (velocity) of the transmitter with respect to the target, $f_d$ is the Doppler shift frequency, $f_{rf}$ is the carrier frequency, and C is the speed of light ($6.696 \times 10^8$ MPH). Applying this at a carrier frequency of 24.125 GHz, and $f_d = (0.125 \times f_s)$, as determined from the graph of the spike 700, yields a speed of V=26 MPH. Another smaller spike 702 represents the target moving at a relative speed of 52 MPH computed in the same manner. A broken line 704 is shown at 7.5 kHz. Because the results of the FFT operation are periodic, the results to the left of the broken line 704 are mirrored on the right side of the broken line 704. (The period of the FFT is equal to $f_s$, however, because the signals are real, the power spectrum is symmetric about $f_s/2$, for $0 < n < f_s$).

Figure 8:
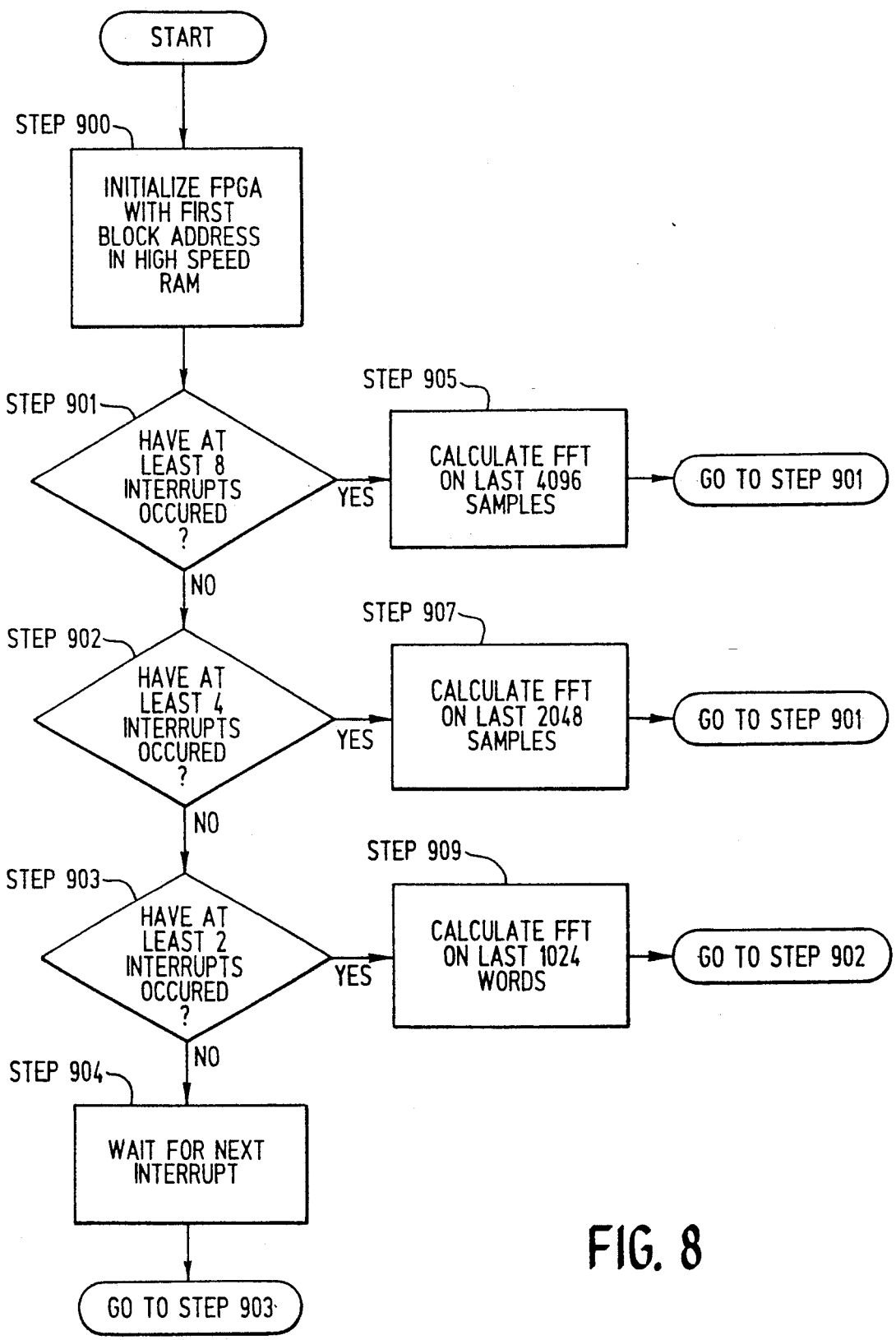
FIG. 8 is a high level flow chart of the method by which the DSP of the preferred embodiment determines the number of samples upon which to perform an FFT calculation.

FIG. 8 is a high level flow chart of the method by which the number of digital data words to be included in an FFT calculation is determined in the preferred embodiment of the present invention. Initially, the RAM 506 has no data stored and the FPGA 504 must be initialized by the DSP 508 with the location in the RAM 506 at which to begin to store the digital data sent from the A/D converter 310 to the FPGA 504 (STEP 900). Once the FPGA 504 has been initialized, the DSP 508 counts the number of interrupts that occur to determine how many samples have been stored in the RAM 506 by the FPGA 504. Each interrupt indicates that 512 samples have been stored. Immediately after the FPGA 504 has been initialized it begins collecting data from the A/D converter 310. When the FPGA 504 has stored 512 samples from each channel in the RAM 506, the FPGA 504 generates an interrupt. The DSP 508 keeps an internal counter in a register, and increments the count each time an interrupt is generated by the FPGA 504.

If there have not been at least 8 interrupts (STEP 901), the DSP 508 checks whether there have been at least 4 interrupts (STEP 902). If there have not been at least 4 interrupts, the DSP 508 checks whether there have been at least 2 interrupts (STEP 903). If there have not been at least 2 interrupts, the DSP 508 waits for the next interrupt (STEP 904). When the next interrupt occurs (i.e., 512 samples of each channel have been stored in the RAM 506), the DSP 508 checks once again whether at least 2 interrupts have occurred (i.e., whether at least 1024 samples of each channel have been stored in the RAM 506) (STEP 903). Steps 903 and 904 are repeated until the FPGA 504 has generated at least 2 interrupts.

When the second interrupt is generated, the response to the inquiry of STEP 903 is "yes", and the DSP 508 calculates an initial FFT using the last 1024 samples of each channel stored in the RAM 506 (STEP 909). When the initial FFT is complete, the DSP 508 checks whether at least 4 interrupts have been generated by the FPGA 504 (STEP 902). If less than 4 interrupts have been generated, STEPS 903 and 909 are repeated. When the response to the inquiry at STEP 902 is "yes", the DSP 508 calculates a next FFT using the last 2048 samples of each channel stored in the RAM 506 (STEP 907). Upon completion of the 2048 sample FFT of STEP 907, the DSP 508 checks whether the FPGA 504 has generated at least 8 interrupts (STEP 901). STEPS 901, 902 and 907 are repeated until at least 8 interrupts have been generated by the FPGA 504.

Once 8 or more interrupts have been generated by the FPGA 504, the DSP 508 calculates each succeeding FFT using the last 4096 samples of each channel stored in the RAM 506 (STEP 905). STEPS 901 and 905 are repeated until either the system is removed from service, or interference is encountered. If interference is encountered, the microcontroller 510 instructs the DSP 508 to flush the samples thus far collected and begin the process of FIG. 8 from the start, resetting the counter that counts the number of interrupts generated. Use of the samples previously collected would distort the result due to their contamination by the interference. Thus, this method of calculating the FFT provides the most accurate information regarding the nature of the targets present in the least amount of time possible, since it would require a substantially longer period of time to collect 4096 new samples from each channel.

The DSP 508 is coupled to the microcontroller 510. The microcontroller 510 is coupled to the clock 514, which determines the operational speed of the microcontroller 510. In the preferred embodiment of the present invention, the microcontroller 510 operates at approximately 16 MHz. The microcontroller 510 is also coupled to a local random access memory (RAM) 512 and a Flash Programmable Read Only Memory (PROM) 520. The Flash PROM 520 stores the instructions which the microcontroller 510 executes. The microcontroller 510 uses the local RAM 512 as a utility memory space in which the microcontroller 510 stores previously detected target information and a record of events.

The DSP 508 transmits to the microcontroller 510 four coded 24-bit words associated with each FFT operation. The first word indicates the number of targets present, the second word indicates the number of scaling bits, the third word indicates the magnitude of the low frequency noise floor, and the fourth word indicates the magnitude of the high frequency noise floor. The high and low frequency noise floors are determined by calculating the average of the power levels of each frequency above and below, respectively, a predetermined frequency. Following these four digital data words are sets of additional digital data words associated with each identified target. Each set consists of four digital data words associated with one target. These four words indicate the Doppler frequency of the target, the magnitude of the signal reflected from the target at the channel 1 frequency, the magnitude of the signal reflected from the target at the channel 2 frequency, and the difference between the phase of the channel 1 and channel 2 signals.

In the preferred embodiment of the present invention, the magnitude of the channel 1 and channel 2 reflected signals are transmitted from the DSP 508 to the microcontroller 510 only to aid in determining when the system has failed to properly identify a target. For example, under normal conditions, the magnitude of the channel 1 frequency should be approximately equal to the magnitude of the channel 2 frequency. If the two magnitudes are not approximately equal, it is likely that the target in question was erroneously detected and the data is disregarded.

Likewise, the magnitude of the low frequency noise floor and the magnitude of the high frequency noise floor are used to check the validity of the FFT operation and the presence of RF interference. Since it is a characteristic of the noise floor spectrum output by an FFT that the low frequency noise floor has a higher apparent power level then the high frequency noise floor, the microcontroller 510 checks to ensure that such is the case. If the low frequency noise floor is not greater than the high frequency noise floor, then an error/interference condition is assumed.

If the microcontroller 510 determines that the noise floor is above a selected threshold value, an assumption is made that there is RF interference with the transmit signal at one or both of the transmit frequencies. In such a case, the microcontroller 510 sends a command to the DSP 508 to flush the data that has thus far been stored and restart the sequence described in the flow chart shown in FIG. 8, with the exception that the FPGA 504 need not be initialized with the first address in the RAM 506 (STEP 900). In addition, the microcontroller 510 commands the frequency voltage generator 316 to change the level of the voltages applied to the Gunn diode 202, thereby changing the transmit frequency.

From the information transmitted to the microcontroller 510 from the DSP 508, the microcontroller 510 calculates the range and relative speed of each target. The determination of the relative speed and distance is directly calculated by multiplying the frequency and phase difference by fixed factors, since the phase is linearly proportional to distance to (or range of) the target according to the formula, $R = C(\theta_1 - \theta_2)/(4\pi(f_1 - f_2))$, and frequency is linearly proportional to the relative speed of the target according to the formula, $f_d = 72$ (Hz.hours/mile)$\times V$ (miles/hour). In the range formula, R is the range in feet, C is the speed of light in feet/second, $f_1$ is the frequency of the channel 1 signal, and $f_2$ is the frequency of the channel 2 signal. In the relative speed formula, $f_d$ is the frequency shift due to the Doppler phenomenon, and V is the relative velocity of the target with respect to the transceiver. However, in alternative embodiments, other means to map the frequency to a relative speed and the phase relationship to range may be used. For example, a table may be used to cross-reference frequency and phase to relative speed and distance, respectively.

If the data is not within selected preset limits it is deemed to be invalid and is disregarded. If the data is within the preset limits, the microcontroller 510 compares the new target range and relative speed with ranges and relative speeds previously recorded. If the range and relative speed of a target is consistent with the range and relative speed of a previously recorded target (i.e., if the difference between the range and speed of a new target and the range and speed of a previously recorded target is within a predetermined amount), the microcontroller 510 updates the range and relative speed previously recorded with the newly received range and relative speed. If the new target does not correspond to an existing target, the range and relative speed are stored and a new target is thus defined. When the microcontroller 510 fails to receive data that closely matches a previously recorded target, the previously recorded target is assumed to have left the environment and the range and relative speed are dropped from the record. Thus, the system identifies and tracks a multiplicity of targets concurrently.

The microcontroller 510 employs a target priority system to determine which one of the multiplicity of targets presents the greatest hazard, assigns a hazard priority, and alerts the driver with the appropriate level of urgency. The system continues to track and reevaluate the hazard priority assigned to each target. If the range and relative speed of an older target fails to be similar to the range and relative speed of newer targets, the system discontinues tracking the old target while continuing to track each of the remaining targets.

A hazard algorithm may be used which is as simple as alerting the vehicle operator that a target is present within a range of 500 ft., as in the illustrated embodiment of present invention. More sophisticated algorithms such as the algorithm taught in U.S. Pat. No. 4,916,450 entitled Radar System for Headway Control of a Vehicle, which is hereby incorporated by reference are used in alternative embodiments of the present invention.

Display and sensor section

The digital electronics system 500 is coupled to a display and sensor section 600. The display and sensor section 600 is shown in more detail in FIG. 9. The display and sensor section 600 includes a monitoring section 601, a warning section 603, and a sensor section 605.

The sensor section 605 includes a multiplicity of sensors, such as a vehicle turn sensor 608, a brake sensor 610, a power monitor sensor 612, a windshield wiper sensor 614, and a speed coil sensor 616 a twin signal sensor 617, and/or a blind spot detector 618. The microcontroller 510 is coupled to each sensor 608, 610, 612, 614, 616, 617, and 618. The sensors provide information which is used to determine whether there is a danger present or to alter the factors used to compute a hazard level. For example, if the microcontroller 510 detects that the windshield wipers of the vehicle have been turned on, thus indicating a rain condition, the preferred following distance from targets may be lengthened to account for longer stopping distance on a wet road. Additionally, the power output by the transmitter may be increased to compensate for the attenuation caused by rain or snow conditions.

If a danger is present, the microcontroller 510 activates an appropriate visual and/or audio warning. The level of the danger is preferably determined based upon brake lag, brake rate, vehicle speed, closing rate, target distance, and the reaction time of the operator. In the preferred embodiment, an average reaction time is used. However, the microcontroller 510 could request the operator to perform various exercises to establish the particular reaction time of the operator at the time that a trip begins. Alternatively, the vehicle operator's reaction to events that occur throughout a trip may be used to determine the reaction time of the operator.

The warning section 603 includes a control display unit 604 and an audio warning unit 606. The control display unit 604 includes warning lights that are illuminated when a danger is present. In the preferred embodiment of the present invention, the color of the lights change from green to yellow to red, respectively, as the level of the danger increases. The audio warning unit 606 includes a sound generator that emits an audible beep or warble if the hazard level exceeds a threshold level.

In the preferred embodiment, the microcontroller 510 monitors a volume potentiometer (not shown) and an advanced warning potentiometer (not shown) within the control display unit 604. The volume potentiometer and the advanced warning potentiometer are controlled directly by the vehicle operator and are used by the system to determine the level of the warning. It should be understood that a wide variety of methods for warning the vehicle operator of danger fall within the scope of the present invention, such as inducing vibration in the steering wheel, pedals or other vehicle controls, such that the vibration increases as the level of the warning increases, and/or activating an audible tone that increases in pitch or volume as the level of the warning increases.

The monitoring section 601 preferably includes an EIA RS-232 port connector 602. The RS-232 port connector 602 provides a port from which target information can be communicated to external devices, and from which diagnostics can be performed on the system. The microcontroller 510 is coupled to RS-232 port connector 602, thereby providing information and system access to external devices coupled to the port connector 602.

Because the present invention converts the receive signal from analog form to digital form immediately after down-converting the signal, and because the present invention uses a digital signal processor which is optimal for performing FFT operations to determine the characteristics of the received signal, such as the frequency spectrum and phase, the system has the advantage of being very flexible, inexpensive, stable over temperature, and compact. Furthermore, the use of only two channels simplifies the invention without sacrificing function. This further reduces the overall size of the invention.

A number of embodiments of the present invention have been described. Nevertheless, it will be understood that various modifications may be made without departing from the spirit and scope of the invention.

For example, the relationship between the channel 1 transmit signal and the channel 2 transmit signal may be such that they differ in frequency by more or less than 250 KHz. Furthermore, the period of the frequency control voltage signal may be greater or less than 15.6 μS, and may have a duty cycle of greater than or less than 50 percent. As another example, the A/D converter 310 may generate a parallel stream of data words rather than a serial stream. Moreover, it should be understood that the present invention may be used in conjunction with automobiles, trucks, water vehicles, trains, or any other surface vehicle. Accordingly, it is to be understood that the invention is not to be limited by the specific illustrated embodiment, but only by the scope of the appended claims.

We claim:

1. A vehicular radar system for detecting targets about an automotive vehicle having an operator, and warning the operator of dangers presented by the targets, including:
   a) a microwave transceiver means for transmitting, receiving, and comparing the frequencies of at least two radio frequency (RF) signals, and generating a time-multiplexed output signal of the frequencies;
   b) front end electronics means, coupled to the microwave transceiver means, for digitizing the time-multiplexed output signal generated by the microwave transceiver means and converting the output signal of the microwave transceiver means from an analog signal to an interleaved sequence of digital data words, each subsequence of digital data words corresponding to one of the frequencies;
   c) digital electronics means for determining the presence of targets, calculating the range of each target, and calculating the relative speed of each target with respect to the automotive vehicle, including:
      (1) at least one digital signal processor means, coupled to the front end electronics means, for mapping the digital data words output by the front end electronics means from the time domain to the frequency domain for each subsequence of digital data words to determine the frequency of the received signal from each target;
      (2) at least one microcontroller means, coupled to at least one of the digital signal processor means, for determining the range of each target from the phase difference between the received signal from such target for each of the RF signals, and for determining the relative speed from the frequency difference between the received signal from such target for each of the RF signals and for tracking the targets and assessing dangers presented by the targets as a function of such determined range and relative speed; and
   d) display and sensor means coupled to the microcontroller means for presenting a indications to the automotive vehicle operator of the presence of danger presented by the targets.

2. The vehicular radar system of claim 1, wherein the microwave transceiver means includes:
   a) an antenna means for transmitting a radio frequency transmit signal, and for receiving a radio frequency receive signal reflected off a target in the environment of the automotive vehicle; and
   b) a frequency difference detection means coupled to the antenna means for generating an output signal having a frequency equal to the difference between the frequency of the radio frequency transmit signal and the frequency of the radio frequency received signal.

3. The vehicular radar system of claim 2, wherein the front end electronics means includes a dual-channel analog to digital converter means coupled to the frequency difference detection means for converting the output signal of the difference detection means from an analog signal to digital data words.

4. The vehicular radar system of claim 3 wherein the microwave transceiver means further includes;
   a) a radio frequency generation means for generating the radio frequency transmit signal coupled to the antenna means; and
   wherein the radio frequency transmit signal consists of a first radio frequency signal having a first frequency and a second radio frequency signal having a second frequency, the first radio frequency signal being time multiplexed with the second radio frequency signal.

5. The vehicular radar system of claim 4, wherein the radio frequency generation means is coupled to a frequency control voltage signal means for causing the radio frequency generation means to alternate between the first radio frequency signal and the second radio frequency at predetermined intervals.

6. The vehicular radar system of claim 5, wherein the front end electronics means further includes:
   a) a signal switch means for time demultiplexing the output signal of the difference detection means to create a first difference signal and a second difference signal, the first difference signal and the second difference signal corresponding to the first radio frequency signal and the second radio frequency signal respectively;
   b) a channel 1 filter coupled to the signal switch means for reducing the power level of frequencies above a cutoff frequency present in the first difference signal; and
   c) a channel 2 filter coupled to the signal switch means for reducing the power level of frequencies above a cutoff frequency present in the second difference signal.

7. The vehicular radar system of claim 6, including a second channel 1 filter and a second channel 2 filter for preventing aliasing, wherein the cutoff frequency of the second channel 1 filter and the second channel 2 filter are each less than one-half of a selected frequency of interest.

8. The vehicular radar system of claim 7, wherein the second channel 1 filter and the second channel 2 filter are each digital filters.

9. The vehicular radar system of claim 8, wherein the second channel 1 filter and the second channel 2 filter are integral to the analog to digital converter means.

10. The vehicular radar system of claim 6, wherein the front end electronics means further includes a frequency control voltage generator means coupled to the radio frequency generation means for generating the frequency control voltage signal.

11. The vehicular radar system of claim 5, wherein the front end electronics means further includes;
   a) a preamplifier means, coupled to the difference detection means, for amplifying the output of the difference detection means;
   b) a signal switch means having a first and a second output, coupled to the preamplifier means, for time demultiplexing the output signal of the difference detection means to output a first difference signal from the first output and a second difference signal from the second output, the first and second difference signal corresponding to the first and second radio frequency signals, respectively;

c) a channel 1 filter coupled to the signal switch means for reducing the power level of frequencies above a cutoff frequency present in the first difference signal; and d) a channel 2 filter coupled to the signal switch for reducing the power level of frequencies above a cutoff frequency present in the second difference signal.

12. The vehicular radar system of claim 11, wherein the front end electronics means further includes:

a) a channel 1 amplifier means, coupled to the output of the channel 1 filter, for increasing the signal strength of channel 1 filter output; and b) a channel 2 amplifier means, coupled to the output of the channel 2 filter, for increasing the signal strength of the channel 2 filter output;

and the analog to digital converter means further includes:

c) a first and a second channel, each channel including;

(1) a digital to analog converter means, coupled to a corresponding one of the channel 1 and channel 2 amplifier means, for converting the analog output of the corresponding amplifier means from an analog signal to a serial stream of digital data words; and (2) a digital filter means having a cutoff frequency, coupled to a corresponding one of the digital to analog converter means, for reducing the power of frequencies at the output of the digital filter which are above the cutoff frequency of the digital filter means; and d) a multiplexer means, coupled to the first and second channel of the analog to digital converter means, for time multiplexing the serial stream of digital data words output by each channel of the analog to digital converter means into a single serial stream of digital data words.

13. The vehicular radar system of claim 12, wherein the front end electronics means further includes a timing generator means, coupled to the microcontroller means, the analog to digital converter means, the signal switch means, and the preamplifier means, for controlling and synchronizing the time at which (1) the radio frequency generation means alternates between the first radio frequency signal and the second radio frequency signal, (2) the signal switch means couples the preamplifier means to the channel 1 filter, (3) the signal switch means couples the preamplifier means to the channel 2 filter, (4) the analog to digital converter means samples the output of the channel 1 amplifier means, and (5) the analog to digital converter means samples the output of the channel 2 amplifier means, such that the first and second difference signals correspond in time to the first and second radio frequency signals, and such that the output of the analog to digital converter means is a serial stream of digital data words alternating between one word representative of the amplitude of the first difference signal and one word representative of the amplitude of the second difference signal at a rate equal to twice the cutoff frequency of the digital filter means.

14. A vehicular radar system for detecting targets about an automotive vehicle having an operator, sensing the status of the controls and relevant environmental conditions in which the automotive vehicle is operating, and warning the operator of the automotive vehicle of dangers presented by the targets, including:

a) a dual-channel microwave transceiver means for transmitting, receiving, and comparing the frequency of radio frequency signals, including:

(1) an antenna means for transmitting a radio frequency transmit signal, and for receiving a radio frequency receive signal reflected off a target in the environment of the automotive vehicle; and (2) a frequency difference detection means coupled to the antenna means for generating an output signal having a frequency equal to the difference between the frequency of the radio frequency transmit signal and the frequency of the radio frequency received signal;

b) a dual-channel front end electronics means coupled to the frequency difference detection means for digitizing the output signal generated by the difference detection means, including an analog to digital converter means coupled to the frequency difference detection means for converting the output of the difference detection means from an analog signal to a serial stream of digital data words;

c) a digital electronics means for determining the presence of targets, calculating the range of each target, and calculating the relative speed of each target with respect to the automotive vehicle, including:

(1) a digital signal processor means coupled to the analog to digital converter means for mapping the digital output of the analog to digital converter means from the time domain to the frequency domain to determine range and relative speed of the targets from which the radio frequency receive signal is reflected;

(2) a microcontroller means coupled to the digital signal processor means for tracking the targets, and assessing dangers presented by the targets; and d) a display and sensor means coupled to the microcontroller means for presenting a indications to the automotive vehicle operator of the presence of the danger presented by the targets, and sensing the status of the controls and relevant environmental conditions in which the automotive vehicle is operating, including:

(1) a plurality of sensor means for determining the status of the vehicle controls;

(2) a warning means for indicating to the operator of the vehicle that danger is present; and (3) a monitor means for communicating the status of the vehicular radar system to external devices.

* * * * *